June 10, 1930.    F. PRANTL    1,763,537

CONTROL OF SINGLE PHASE MOTORS

Filed Dec. 16, 1927

F. Prantl
INVENTOR
By Marks & Clerk
Attys.

Patented June 10, 1930

1,763,537

UNITED STATES PATENT OFFICE

FRANZ PRANTL, OF WETTINGEN, NEAR BADEN, SWITZERLAND, ASSIGNOR TO AKTIEN-GESELLSCHAFT BROWN, BOVERI AND CIE., OF BADEN, SWITZERLAND

CONTROL OF SINGLE-PHASE MOTORS

Application filed December 16, 1927, Serial No. 240,561, and in Germany December 18, 1926.

This invention is concerned with equipment for effecting speed control of single-phase series commutator motors by the method of voltage variation and has particular reference to the control of two motors or two groups of motors which are connected in series and receive power from separate parts of the supply transformer.

The object of the invention is to provide suitable speed control equipment for motors of the type indicated in which the number of transformer tappings and the current-carrying capacities of the switches is reduced to a minimum consistent with satisfactory operation of the motors under the arduous conditions of railway or similar service.

Another object is the provision of control equipment for motors of the type indicated above with which racing of individual and uncoupled motors cannot take place.

A further object is the provision of motor control equipment of the type indicated above which is particularly applicable to locomotives with individual axle drive.

Other and further objects and advantages attained by the invention will be pointed out or indicated hereinafter or will be obvious to one skilled in the art upon an understanding of the invention or its employment in practice.

In the drawing accompanying this specification I show three embodiments of the invention, but it is to be understood that these are presented for illustration only and are not to be accorded any interpretation having the effect of limiting the claims short of the true and most comprehensive scope of the invention in the art.

In the drawing:—

Figure 1:
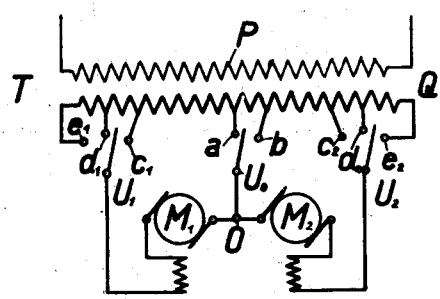
Figure 1 shows in diagrammatic fashion two motors fed from a power transformer and controlled in accordance with the invention.

The largely increased power of electric locomotives necessitates the use of a large number of driving motors, which may be operated in series, parallel or series-parallel connection where the motors are of the single-phase commutator type. There are, however, very considerable drawbacks to all three methods of connection which appear as disturbing influences during the operation of the locomotive. To operate a number of large motors in parallel requires costly switch gear, since the switches and contacts must be designed to deal with the sum of all the motor currents. Connecting the motors in series gives relatively small currents to be controlled, but the method can only be employed to advantage when all the motors are rigidly coupled together, for the reason that without such rigid coupling, for example when individual axle drive is adopted, one motor of the series may start to race and thereby take upon itself the full voltage applied to the series. The racing motor will then cause the current to fall to such an extent that the torque of the other motors falls to zero and the locomotive can exert no tractive force. Thus simple series connection of the motors cannot be adopted for locomotives with individual axle drive without certain modifications. If it is desired to combine the advantages of series connection with those of a separate power supply to each motor, this may be accomplished by subdividing the secondary winding of the supply transformer by means of tappings into as many sections as there are motors and connecting the ends of the secondary to the ends of the series of motors and the junctions between adjacent motors to the appropriate tappings on the secondary. Each motor of the series will then receive power from an independent part of the supply transformer. The greatest drawback to this arrangement, however, is the difficulty of varying the voltage applied to the motors for purposes of speed control. Such control could be obtained by providing a large number of tappings, but the equipment and its operation would be exceedingly complicated. For example in order to reduce the voltage applied to each motor by one step it would be necessary to make the steps for all the motors unequal in order to obtain the desired result. Thus, commencing at one end of the series, the tap change for the first motor would be equivalent to 1, for the second motor 2, for the third 3 and so on, thus ensuring that the same voltage is applied to all the motors. This, however, would necessitate the number of tappings on the transformer secondary being practically equivalent to the product of the number of motors into the number of control steps. A very much simpler method of control requiring fewer tappings is, however, obtainable using two series-connected motors or groups of motors by making the tap changes in two directions considered with regard to the middle point of the secondary winding, an increase in the tapping voltage being effected by a movement away from the said middle point, and a decrease in the tapping voltage by a movement towards the same, the tap changes taking place alternately in both directions. Equality between the voltages applied to the motors or groups of motors is ensured by suitably setting a two-way switch connected to a tapping in close proximity to the middle point of the transformer winding.

Figure 2:
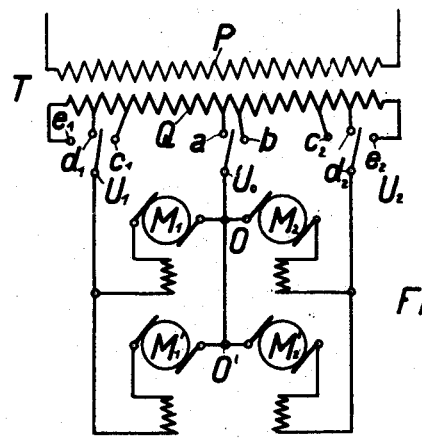
Figure 2 shows a similar arrangement in which a group of two motors takes the place of each of the single motors shown above.
Figure 3:
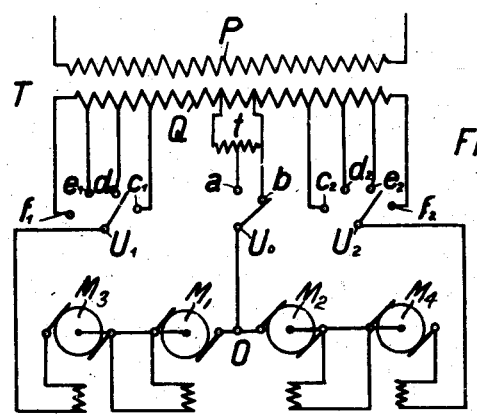
Figure 3 illustrates a modified arrangement in which the motors of each group are in series and a potential divider is provided for the central tapping.

An understanding of the invention will be most readily obtained from the examples illustrated in Figures 1 to 3 of the drawing accompanying this specification. Figure 1 illustrates the case of two single-phase series commutator motors connected in series and supplied from separate parts of the supply transformer, speed control being effected by changing tappings on the main supply transformer. The example illustrated in Figure 2 is similar, the only difference being that each of the motors in Figure 1 is replaced by a group of two motors connected in parallel. In Figure 3 each of the motors of Figure 1 is replaced by two mechanically coupled motors in series. In the said Figures the reference character T denotes the main transformer from which the motors are supplied, P the primary winding of same, Q the secondary winding of same, $M_1$ and $M_2$ single-phase series commutator motors, $a$, $b$, $c_1$, $d_1$, $e_1$, $f_1$, $c_2$, $d_2$, $e_2$, $f_2$ multi-way switch contacts connected to tappings on the transformer secondary, O or $O^1$ the junction between two motors or groups of motors connected in series, $t$ a potential divider.

It will be seen from Figure 1 that the motors $M_1$ and $M_2$ are connected in series. The junction O between the two motors is connected to the arm of the two-way switch $U_o$ which operates over the contacts $a$ and $b$. The contact $a$ is joined to the middle point of the secondary winding Q and the contact $b$ to a point spaced at such a distance therefrom that the voltage between the two is equal to that of a full control step. The free end leads of the series connected motors are joined to the multi-way switches $U_1$ and $U_2$ respectively whereby the said end leads can be joined to the contacts $c_1$, $d_1$, $e_1$, or $c_2$, $d_2$, $e_2$. These contacts are connected to tappings from the winding Q spaced a double voltage control step apart. If $n$ is the number of control steps the total number of tappings will be $n+2$.

The method of effecting speed control by means of the equipment described above is as follows:—

Let it be assumed that the speed of the motors is to be varied over the full range. The central two-way switch $U_o$ and one of the outer multi-way switches ($U_2$ for example) are first concurrently moved one step forward, that is to say in the present case $U_o$ is moved from $a$ to $b$ and $U_2$ is moved from $c_2$ to $d_2$. The central switch $U_o$ and the outer switch $U_1$ on the opposite side are then moved concurrently in the opposite direction, that is the switch $U_o$ is moved from $b$ to $a$ and the switch $U_1$ from $c_1$ to $d_1$. The process is then repeated. It will be seen that with each change in speed the central switch $U_o$ is moved either from $a$ to $b$ or from $b$ to $a$ concurrently with one or other of the outer switches, which latter are operated alternately and effect a tap change equivalent to a double voltage control step with each movement.

With the arrangement illustrated in Figure 2 the procedure is the same as above described, but each of the motors $M_1$ and $M_2$ is replaced by a group of motors $M_1$ $M^1_1$ or $M_2$ $M^1_2$, the groups being connected in parallel. The advantage possessed by such an arrangement using two pairs of motors is that one motor may be cut out without disturbing the operation of the other three, since the method of separate power supply renders each group independent of the other.

When the output of the main transformer is large it may happen that the voltage per turn may exceed the voltage of a control step and in such circumstances it may be necessary to connect a potential divider to the middle turns of the secondary and to take the contact $a$ for the switch $U_o$ from the centre thereof. This is shown in Figure 3 where $t$ is the potential divider.

Figure 3 likewise shows two groups of motors in series, the group $M_3$ $M_1$ being joined in series to the group $M_2$ $M_4$. When this is done, however, it is essential that the motors in each group should be mechanically coupled, namely $M_1$ to $M_3$ and $M_2$ to $M_4$, so that no differences in speed can exist within a group. For example the motors $M_1$ and $M_3$ could be arranged to drive a jack shaft and the motors $M_2$ and $M_4$ a second jack shaft of a locomotive, each jack shaft being mounted on a separate truck. The independent power supply to each group prevents an excessive speed rise occurring. Speed control is obtained in the manner described above and the coupling of the motors in each group ensures that the same voltage is applied to each motor.

The above method of speed control used in conjunction with the equipment described will thus permit the use of switches and contacts which are designed to deal with no more than half the sum of the currents for all the motors. The number of contacts and tappings need only be approximately equal to the number of control steps and not the products of the number of steps into the number of motors as with prior art equipments. At the same time the danger of individual motors racing is reduced and loss of torque in the remaining motors is prevented.

The arrangement described is particularly applicable to locomotives fitted with individual axle drive.

Having now described my invention, what I claim as new and desire to secure by Letters Patent is:—

1. Control equipment for step-by-step voltage control of two single-phase series commutator motors or groups of motors connected in series including a supply transformer having a primary and a secondary winding, means including a two-way switch connecting the junction between the two motors or groups of motors selectively to the middle point of the secondary winding or to a tapping spaced therefrom by a single voltage step, and means including a pair of multi-way switches for connecting each of the outer terminals of the motors or groups of motors selectively to the respective ends of the secondary winding or to tappings spaced therefrom by steps, each of which is equivalent to two of the said single voltage steps.

2. Control equipment as claimed in claim 1 wherein the tapping for the single voltage step is constituted by a tapping on a potentiometer connected between the centre point of the secondary winding and a tapping point adjacent thereto on the said secondary winding.

3. A method for the step-by-step voltage control of two series-connected motors fed from the ends and a central tapping point of the secondary winding of a transformer which consists in varying the secondary voltage by a voltage step alternately from either end of said secondary winding and adjusting the tapping point to the centre of the active secondary winding at the same time, as and for the purpose hereinbefore described.

In testimony whereof I have signed my name to this specification.

FRANZ PRANTL.